(12) United States Patent
Lee

(10) Patent No.: US 7,288,717 B1
(45) Date of Patent: Oct. 30, 2007

(54) ELECTRICAL BOX ASSEMBLY FOR A SOLAR ENERGY MODULE

(75) Inventor: Chang Chi Lee, Fengyuan (TW)

(73) Assignee: Jin Hsin Ho Mold Enterprise Co., Ltd., Taichung County (TW)

( * ) Notice: Subject to any disclaimer, the term of this patent is extended or adjusted under 35 U.S.C. 154(b) by 0 days.

(21) Appl. No.: 11/683,874

(22) Filed: Mar. 8, 2007

(51) Int. Cl.
  *H02G 3/08* (2006.01)
(52) U.S. Cl. ............... 174/50; 174/58; 174/64; 220/3.6; 248/906
(58) Field of Classification Search ......... 174/50, 174/58, 64, 57; 220/3.6, 3.9, 4.02; 248/906; 439/535
  See application file for complete search history.

(56) References Cited

U.S. PATENT DOCUMENTS 3,770,872 A * 11/1973 Brown ................ 174/53
4,082,915 A * 4/1978 Silver ................. 174/51

* cited by examiner

*Primary Examiner*—Dhiru R. Patel
(74) *Attorney, Agent, or Firm*—Ming Chow; Sinorica, LLC

(57) ABSTRACT

An electrical box assembly for a solar energy module that includes a lid having outer flanges and a box having slide chutes. The electrical box is assembled by gliding the outer flanges of the lid into the chutes of the box. Using a method, the object will not easily come apart. After the lid has been assembled with the box and covers the box, the through holes of the lid will corresponded to the fastener receiving apertures of the box allowing the fasteners to fix together. A set of shelves includes a first shelf and a second shelf, which can be secured into the first slot and the second slot of the box individually, allowing for electrical parts or devices to be installed on the shelves. In addition, the box, the lid and the shelves are all made of aluminum alloys which can enhance the efficiency of the heat radiation, accomplishing the goal of high heat conductivity and low rate of malfunction.

1 Claim, 5 Drawing Sheets

ELECTRICAL BOX ASSEMBLY FOR A SOLAR ENERGY MODULE

BACKGROUND OF THE INVENTION

1. Field of the Invention

The present invention relates to an electrical junction box for a solar energy module. More particularly, the present invention relates to an electrical box for storing the electrical parts or devices therein.

2. Description of Related Art

A conventional electrical box for a solar energy module as shown in FIG. 5 comprises a box 60 having multiple embedded apertures 61 and a lid 70 having multiple positioned inserting pieces 71. The bottom of the box 60 is hollow, and two shelves are integrally mounted on said bottom so that the electrical parts or devices can be installed on said shelves. The lid 70 and the box 60 can be assembled by engaging the inserting pieces 71 of the lid 70 and the apertures 61 of the box 60. In addition, the box 60 and the lid 70 are made of polycarbonate containing fiberglass. Although this kind of structure accomplishes the function of an electrical box, there still exist some improvable defects, such as:

1. Poor heat conduction: The box and the lid are made of polycarbonate containing fiberglass. This results in poor heat conduction such that the inner electrical parts or devices of the electrical box could sustain damage.

2. High rate of malfunction: The electrical box is assembled by using the inserting pieces 71 of the lid 70 and the embedded apertures 61 of the box 60. However, the inserting pieces 71 are easily broken when assembling the box 60 and the lid 70. Even if only one of the inserting pieces 71 is broken, the assembly and functionality of the electrical box is compromised.

The present invention is intended to improve upon the above mentioned drawbacks of the conventional electrical box. The present invention is an improved electrical box for the solar energy module and solves the problems of the heat conductivity and malfunction.

SUMMARY OF THE INVENTION

The primary object of the present invention is an electrical junction box which contains a box having a first slot and a second slot, slide chutes, fastener receiving apertures and wire joints, and a lid having outer flanges and through holes. The electrical box is assembled by gliding the outer flanges of the lid into the chutes of the box. Using said method, the object will not easily come apart. After the lid has been assembled with the box and covers the box, the through holes of the lid will correspond to the fastener receiving apertures of the box allowing the fasteners to fix them together. A set of shelves comprise a first shelf and a second shelf, the first and second shelves can be secured into the first slot and the second slot of the box individually allowing the electrical parts or devices to be installed on the shelves. In addition, the box, the lid and the shelves are all made of aluminum alloys that enhance the efficiency of the heat radiation, accomplishing the goal of high heat conduction and low rate of malfunction.

Other objects, advantages and novel features of the invention will become more apparent in the following detailed description taken in conjunction with the accompanying diagrams.

DETAILED DESCRIPTION OF PREFERRED EMBODIMENT

Figure 1:
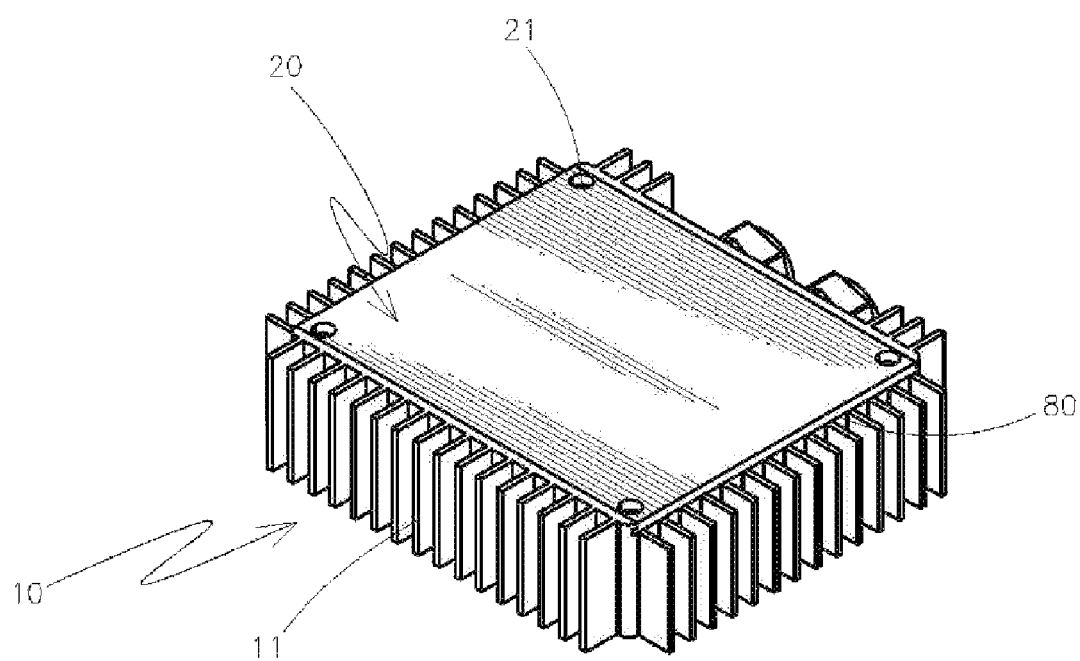
FIG. 1 is a perspective view of the electrical box assembly of the present invention.

While this invention is capable of embodiment in many different forms, shown in the drawings and herein described in detail is the preferred embodiment of the invention. The preferred embodiment is disclosed with the understanding that the present description is but one example of the principles of the invention and is not intended to limit the broad aspects of the invention to the single embodiment illustrated.

Figure 2:
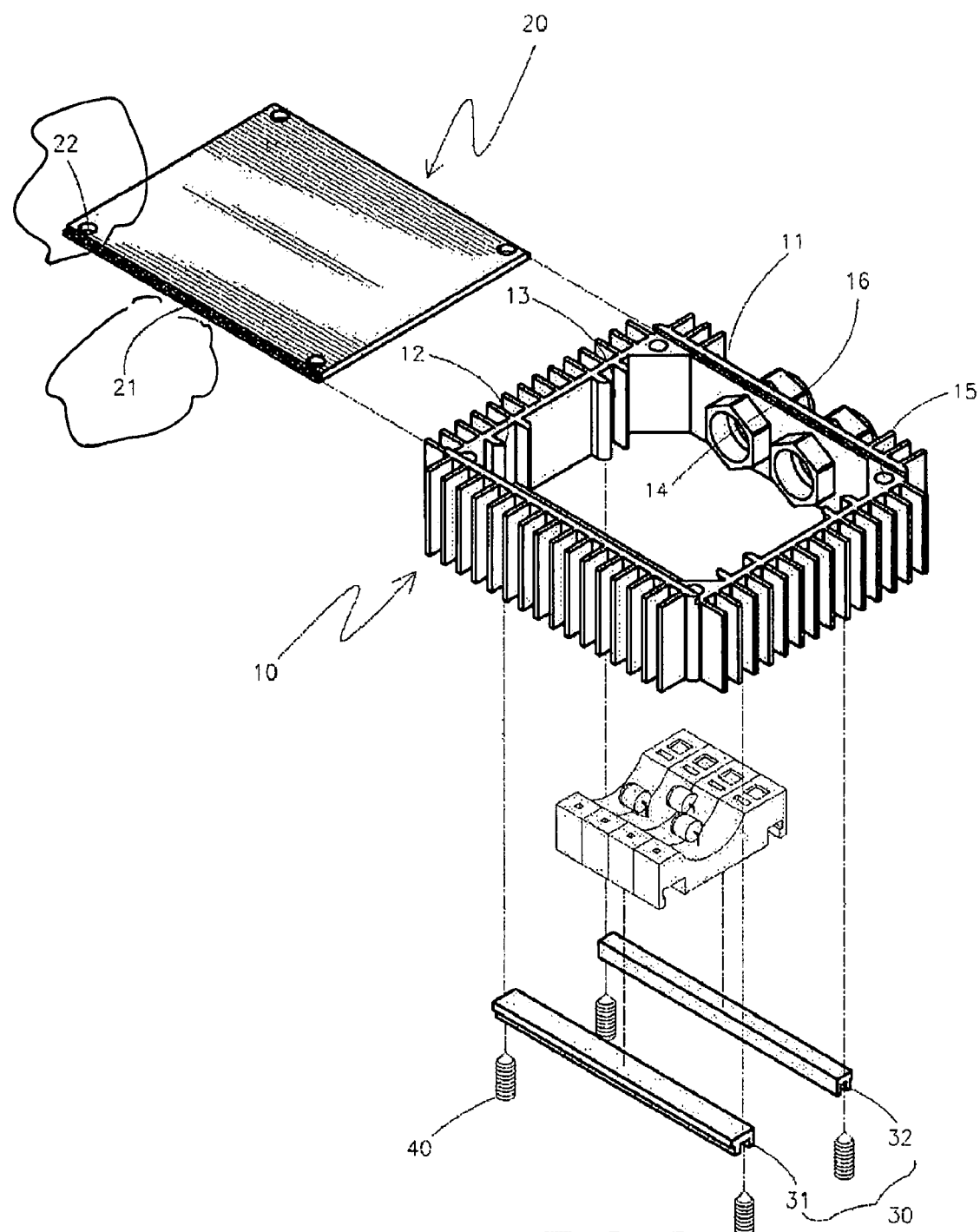
FIG. 2 is a segmented view of the electrical box assembly of the present invention.
Figure 3:
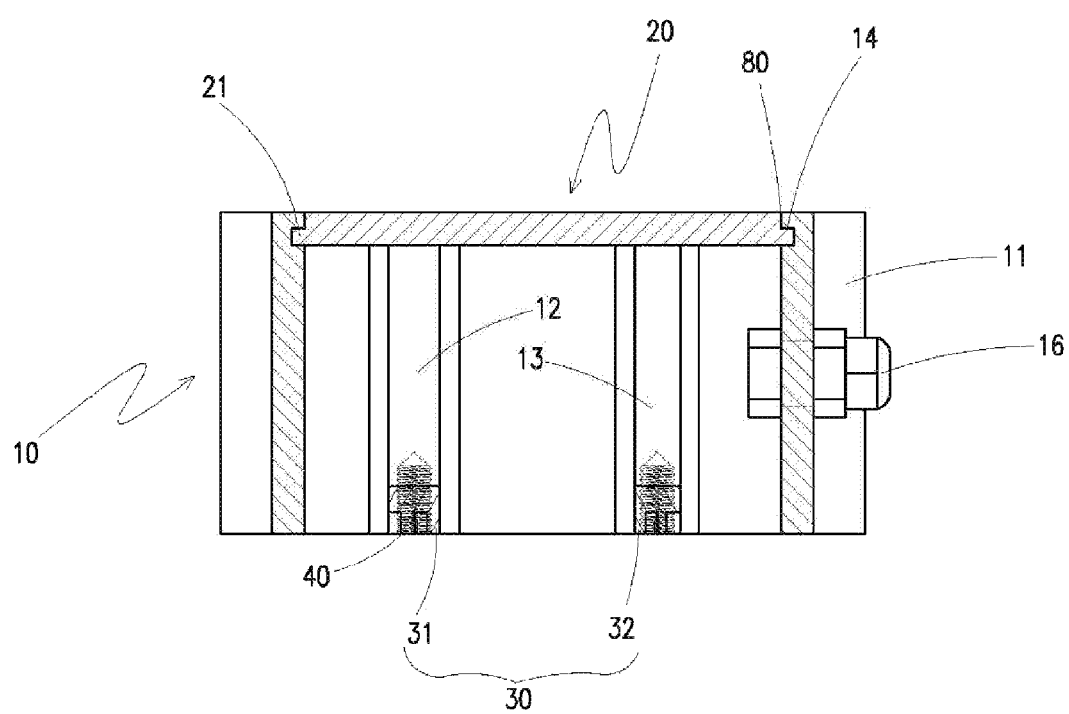
FIG. 3 is a cross-sectional view of the electrical box assembly of the present invention.

Referring to FIG. 1 to FIG. 3, the electrical box for the solar energy module comprising:

a box 10 having a heat sink 11, a first slot 12, a second slot 12, slide chutes 14, fastener receiving apertures 15 and wire joints 16;

a lid 20 having outer flanges 21 and through holes 22;

the electrical box is assembled by gliding the outer flanges 21 of the lid 20 into the chutes 14 of the box 10 and thus the lid 20 can cover the box 10. After the lid 20 has been assembled with the box 10, the through holes 22 of the lid 20 will correspond to the fastener receiving apertures 15 of the box 10 allowing the fasteners 40 to fix them together (Referring to FIG. 4).

A set of shelves 30 comprising a first shelf 31 and a second shelf 32, can be secured into the first slot 12 and the second slot 13 of the box 10 by using the fasteners 40, allowing electrical parts or devices to be installed on the shelves 30.

In addition, the box 10, the lid 20 and the shelves 30 are made of aluminum alloys. After the box 10 and the lid 20 have been assembled, the edges 80 of the electrical box can be sealed by an adhesive (Referring to FIG. 1 and FIG. 3).

FIG. 2 is a segmented view of the electrical box assembly and FIG. 3 is a cross-sectional view of the electrical box assembly. In these diagrams, the lid 20 slides into the chutes 14 of the box 10 and thus the lid 20 can cover the box 10. As long as the lid 20 has been assembled with the box 10, the through holes 22 of the lid 20 will correspond to the fastener receiving apertures 15 of the box 10 allowing the fasteners 40 to fix together. Furthermore, the first shelf 31 and the second shelf 32 are secured into the first slot 12 and the second slot 13 of the box 10 such that electrical parts or devices can be installed on the shelves 30.

Figure 4:
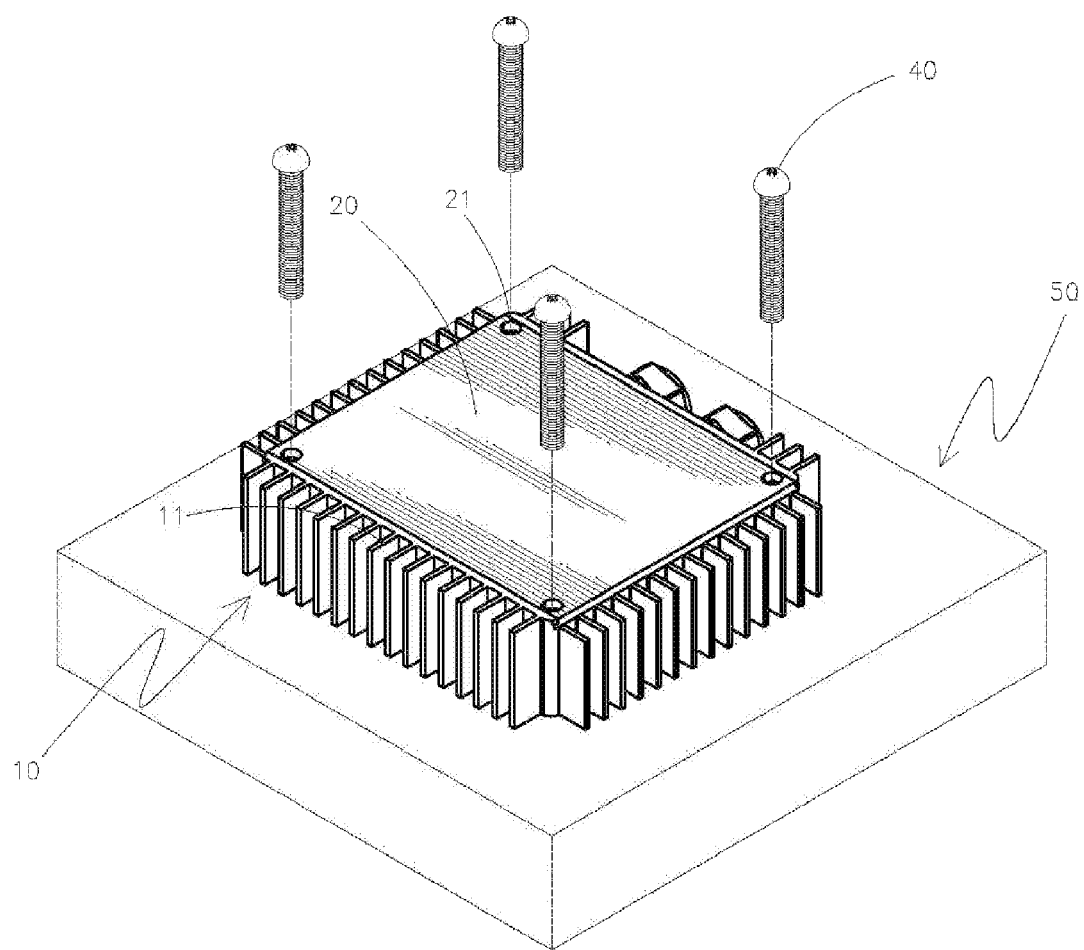
FIG. 4 is a cross-sectional view of the present invention illustrating the use of the electrical box.
Figure 5:
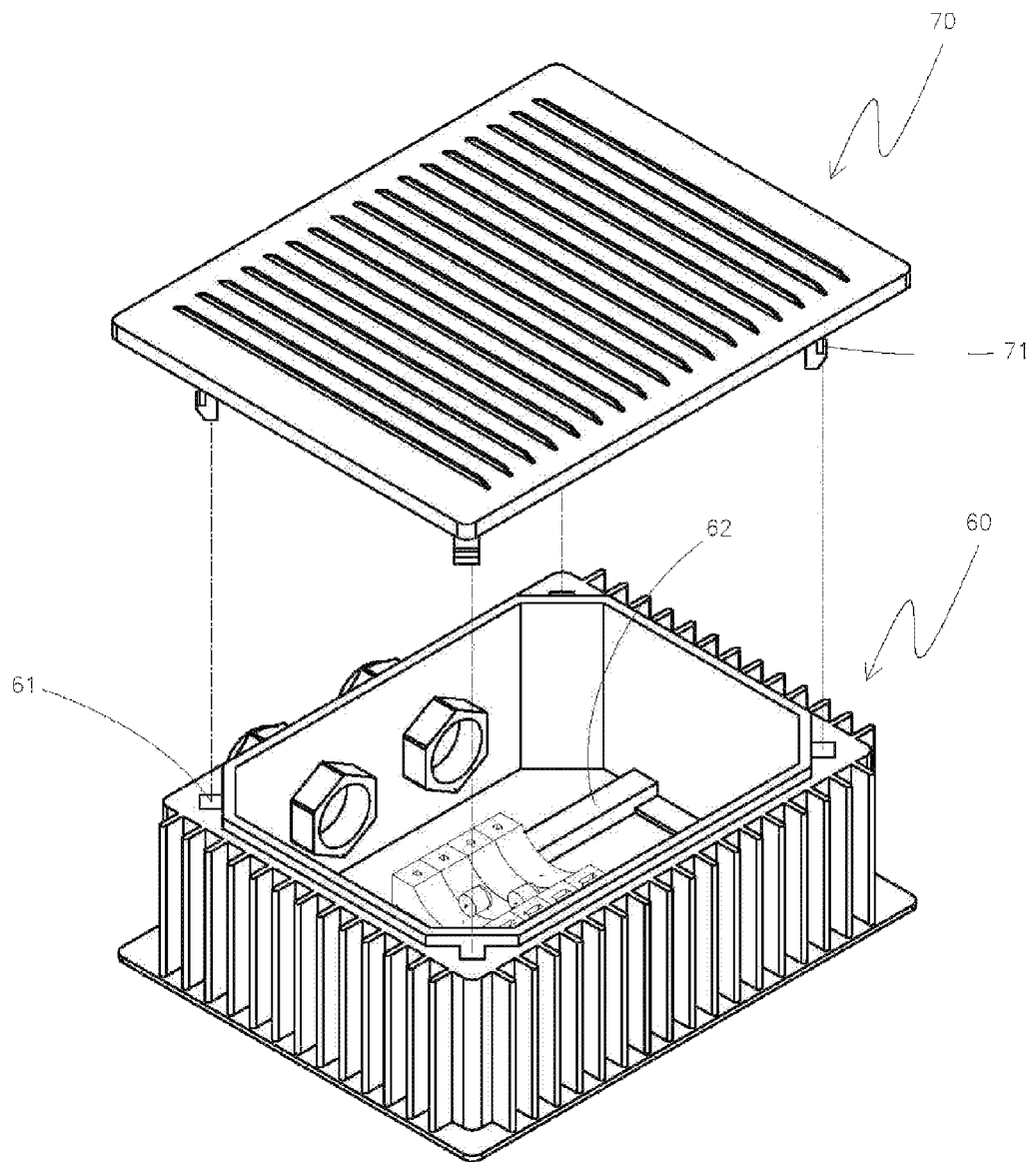
FIG. 5 is a segmented view of the conventional electrical box assembly.

FIG. 4 is a cross-sectional view of the electrical box illustrating the use of the electrical box. After the lid 20 has been placed on the box 10, the through holes 22 will correspond to the fastener receiving apertures 15 of the box 10 allowing the fasteners 40 to fix together; additionally, a solar energy panel 50 can also be fixed by such fasteners 40, facilitating the utility of the present invention.

Although numerous characteristics and advantages of the present invention have been set forth in the foregoing description, together with details of the structure and function of the invention, this disclosure is one example only, and changes may be made with regard to specific details, particularly in matters of shape, size, and arrangement of parts within the invention to the full extent indicated by the general meaning of the terms in which the appended claims are expressed.

What is claimed is:

1. An electrical box assembly, wherein the box assembly is made of aluminum alloys;

a box having a heat sink, a first slot, a second slot, slide chutes, fastener receiving apertures and wire joints;

a lid having outer flanges and through holes; the electrical box is assembled by gliding the outer flanges of the lid into the chutes of the box and thus the lid covers the box; after the lid has been assembled with the box, the through holes of the lid will correspond to the fastener receiving apertures of the box allowing the fasteners to fix together;

a set of shelves having a first shelf and a second shelf, which secure into the first slot and the second slot of the box, allowing electrical parts or devices to be installed on the shelves;

in addition, the box, the lid and the shelves are made of aluminum alloys; after the box and the lid have been assembled, the edges of the electrical box are sealed by an adhesive.

* * * * *